(12) United States Patent
Nipper et al.

(10) Patent No.: US 10,501,184 B2
(45) Date of Patent: Dec. 10, 2019

(54) COMPLIANT AFT PIVOT ASSEMBLIES AND SYSTEMS

(71) Applicant: Raytheon Company, Waltham, MA (US)

(72) Inventors: Joseph P. Nipper, Allen, TX (US); Zachary Scott Zutavern, Dallas, TX (US); Arthur J. Mathews, McKinney, TX (US)

(73) Assignee: Raytheon Company, Waltham, MA (US)

( * ) Notice: Subject to any disclaimer, the term of this patent is extended or adjusted under 35 U.S.C. 154(b) by 590 days.

(21) Appl. No.: 15/181,216

(22) Filed: Jun. 13, 2016

(65) Prior Publication Data

US 2017/0240282 A1    Aug. 24, 2017

Related U.S. Application Data

(60) Provisional application No. 62/299,320, filed on Feb. 24, 2016.

(51) Int. Cl.
    *B64D 1/12*    (2006.01)
    *B64D 37/12*   (2006.01)
    *B64D 1/00*    (2006.01)

(52) U.S. Cl.
    CPC ................ *B64D 1/12* (2013.01); *B64D 1/00* (2013.01); *B64D 37/12* (2013.01)

(58) Field of Classification Search
    CPC ... B64D 1/12; B64D 1/10; B64D 1/08; B64D 1/06; B64D 1/04; B64D 37/12; B64D 5/00; B64D 3/00; B64D 3/02
    See application file for complete search history.

(56) References Cited

U.S. PATENT DOCUMENTS

| 2,921,756 | A | * | 1/1960 | Borden | B64D 5/00 244/2 |
| 6,926,226 | B2 | * | 8/2005 | Gathier | B64D 5/00 244/2 |

FOREIGN PATENT DOCUMENTS

| GB | 566201 A | * | 12/1944 | ............... B64D 3/00 |
| GB | 609456 A | * | 9/1948 | ............. B64D 37/12 |
| WO | WO 91/04910 A1 | | 4/1991 | |

OTHER PUBLICATIONS

International Search Report for International Application No. PCT/US2016/068539 dated Mar. 10, 2017, 12 pages.

* cited by examiner

*Primary Examiner* — Richard R. Green

(57) ABSTRACT

An aft pivot assembly can include a mount device securable to an aft portion of a payload of an aircraft for facilitating release of the payload. The aft pivot assembly can include a shaft operable with the mount device and a release component, the shaft being rotatable about multiple shaft axes relative to the mount device so as to either minimize or eliminate carriage loads about the aft portion, while reacting jettison loads during a jettison event or phase. The rotation of the shaft about its shaft axes can further be limited via a limit device. As the payload transitions from a carriage phase to a jettison phase, the shaft moves in multiple degrees of freedom and in multiple axes relative to the mount device.

20 Claims, 6 Drawing Sheets

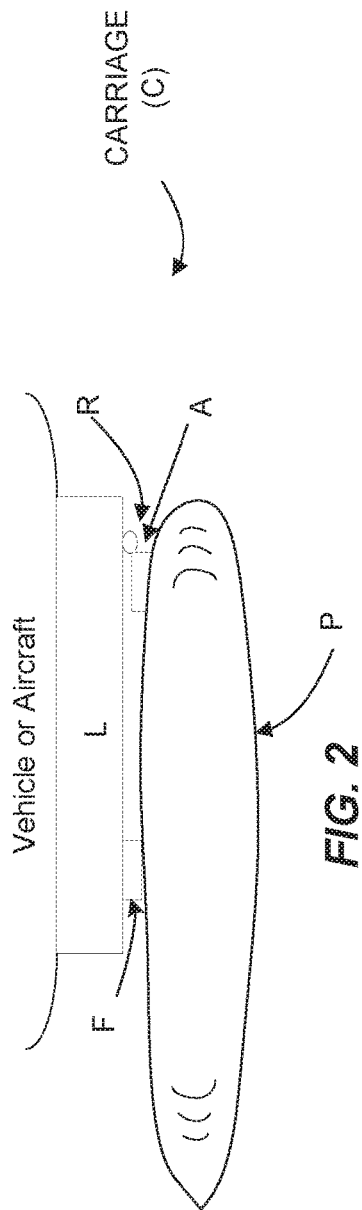
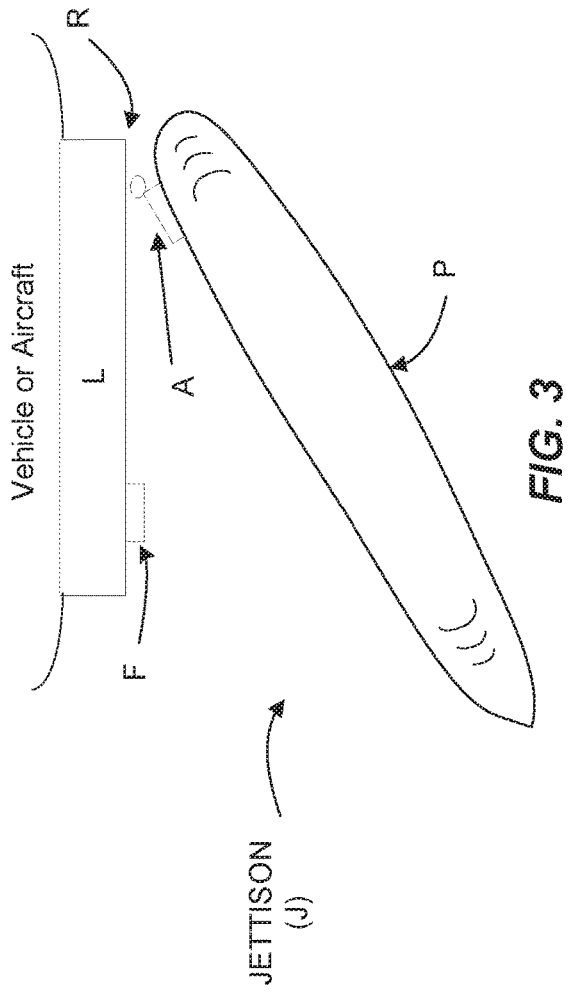

COMPLIANT AFT PIVOT ASSEMBLIES AND SYSTEMS

RELATED APPLICATIONS

This application claims the benefit of U.S. Provisional Patent Application Ser. No. 62/299,320, filed on Feb. 24, 2016, which is incorporated herein by reference in its entirety.

GOVERNMENT LICENSE RIGHTS

This invention was made with government support under Contract No. N00019-13-C-0128 awarded by Naval Air Systems Command. The government has certain rights in the invention.

BACKGROUND

Pylon attached stores or payloads on a vehicle or aircraft platform often require an aft pivot attachment to the pylon to allow for safe separation of the store (jettison), such as deploying a fuel tank during an emergency. With conventional aft pivot assemblies, loads imparted to the aft pivot and into the store are high during flight (carriage loads) as compared to loads during jettison or deployment (jettison loads). As such, conventional aft pivot assemblies attached to a payload must be designed to withstand these significant carriage loads despite the fact that the purpose of the aft pivot assembly is to support safe deployment of the payload away from the aircraft. Designing aft pivot assemblies to accommodate and handle such carriage loads has the drawback of added structure and weight. Many existing aft pivot assemblies have a shaft translatable along its x-axis and rotatable about its x-axis relative to the aircraft; however, such assemblies have various structural limitations and can impart unnecessary carriage loads.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 2 shows a graphical depiction of a payload and aft pivot assembly attached to a platform of an aircraft and in a carriage phase, in accordance with an example of the present invention.

FIG. 3 shows the payload of FIG. 2 in a jettison phase, in accordance with an example of the present invention.

Figure 1A:
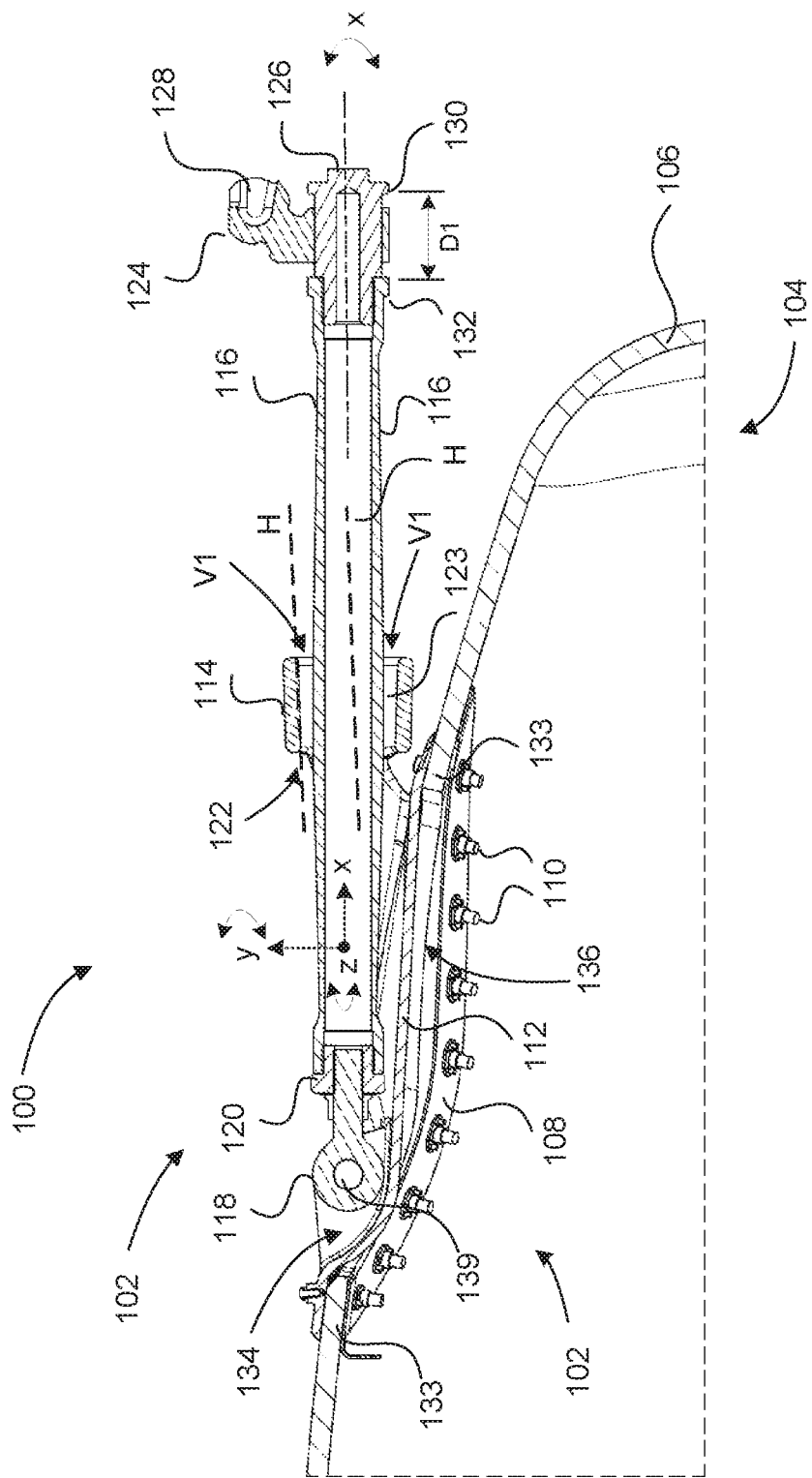
FIG. 1A shows a cross-sectional view of a portion of a payload and an aft pivot assembly about lines 1A of FIG. 1B, in accordance with an example of the present invention.

Reference will now be made to the exemplary examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of technology examples is provided below and then specific technology examples are described in further detail later. This initial summary is intended to aid readers in understanding the technology more quickly but is not intended to identify key features or essential features of the technology nor is it intended to limit the scope of the claimed subject matter.

An aft pivot assembly for facilitating release of a payload from a vehicle to minimize or eliminate carriage loads is disclosed. The assembly can include a mount device that secures of that is securable to an aft portion of a payload of a vehicle, such as an aircraft. The assembly can include a limit device extending from (e.g., coupled to) the mount device. A shaft can be coupled to the mount device, the shaft being rotatable about multiple shaft axes. A release component can be coupled to the shaft and removably coupleable to the aircraft, meaning that it can be coupled to the aircraft and selectively removed. During a carriage phase, and as the payload transitions from a carriage phase to a jettison phase, the shaft moves in multiple degrees of freedom in multiple axes relative to the mount device. Such movements can be constrained or unconstrained, as will be explained below.

In some examples, the limit device can comprise a collar having an opening through which the shaft is loosely received such that a volume of space is defined between the shaft and the collar. In some examples, the assembly can include a spherical bearing rotatably coupling the shaft to the mount device, such that the shaft is allowed to move about its y-axis and z-axis (and relative to the mount device) during the carriage phase (thus facilitating the avoidance or minimization of carriage loads about the aft portion of the payload), and further allowed to rotate about its x-axis and translates along its x-axis, during the jettison phase.

A payload system releasable from a vehicle while either minimizing or eliminating carriage loads about an aft portion of a payload is disclosed in an example of the present disclosure. The system can include a payload body having a forward portion releasably coupled to an aircraft and an aft portion releasably coupled to the aircraft. The payload system can include a mount device secured to an aft portion of the payload body and a limit component coupled to the mount device. A collar having an opening can extend from the mount device. The payload system can further comprise a shaft coupling the mount device to the aircraft via a release component. The release component can be rotationally coupled to the shaft and releasably coupled to the aircraft. The shaft can extend through the opening. As the payload transitions from a carriage phase to a jettison phase, the shaft can move in multiple degrees of freedom in multiple axes (multiple shaft axes) relative to the mount device. Such movement can be limited by the limit device until the assembly and the payload are released from the vehicle about the release component An example method for facilitating release of a payload in multiple degrees of freedom from a vehicle while minimizing or eliminating carriage loads about an aft portion of the payload is disclosed. The method can include providing an aft pivot assembly having a mount device securable to an aft portion of a payload of a vehicle, such as an aircraft. The assembly can include a limit device extending from or coupled to the mount device. A shaft can be coupled to the mount device. A release component can be coupled to the shaft and removably coupleable to the aircraft, meaning the release component can be coupled to the aircraft and selectively removed. The method can include facilitating movement of the shaft within the collar about multiple degrees of freedom in multiple axes relative to the mount device as the payload transitions from a carriage phase to a jettison phase. Such movement can be limited by the limit device until the assembly and the payload are released from the aircraft about the release component.

Figure 1C:
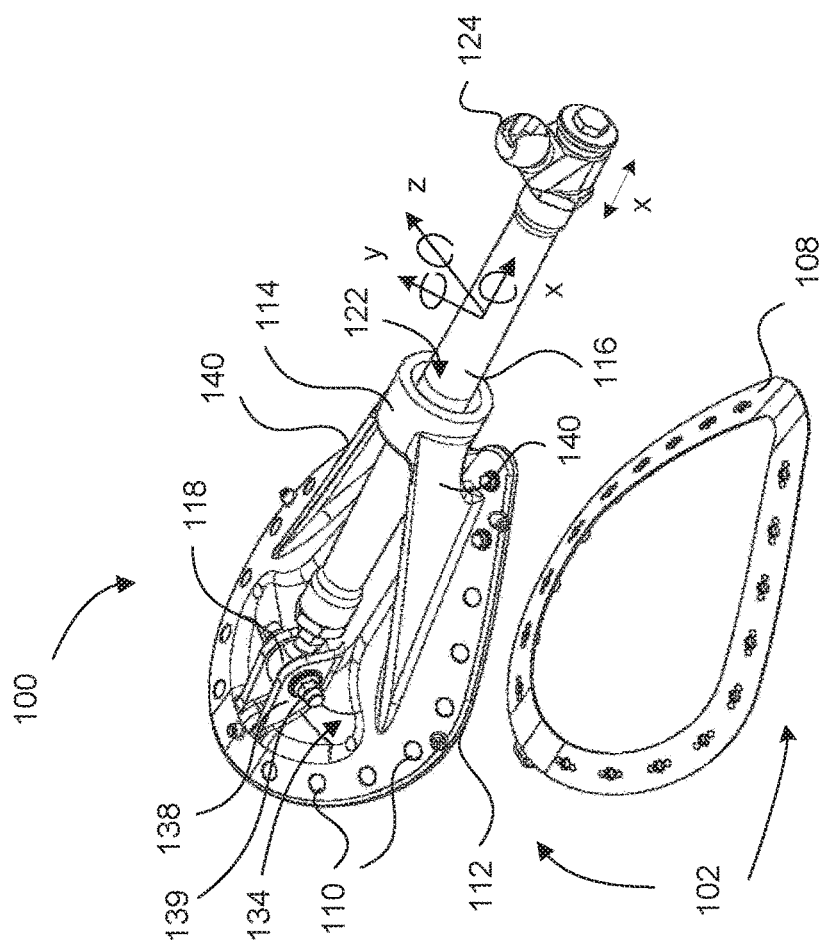
FIG. 1C shows an isometric view of the aft pivot assembly of FIGS. 1A and 1B.
Figure 1B:
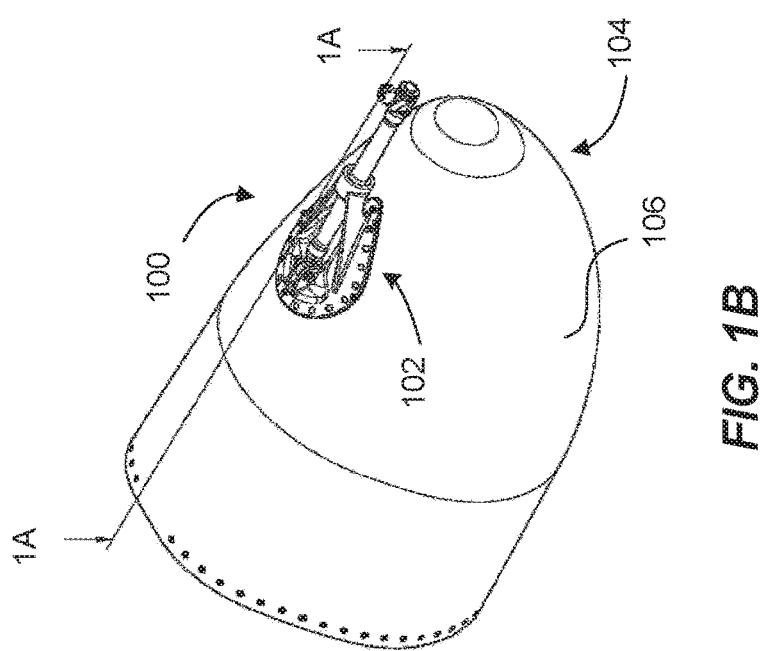
FIG. 1B shows an isometric view of the payload and aft pivot assembly of FIG. 1A.

FIGS. 1A, 1B, and 1C show an aft pivot assembly 100 secured to a payload 106 having a payload body, the payload 106 being releasably attached to a vehicle (e.g., an aircraft) according to an example of the present disclosure. In terms of the general concept, FIGS. 2 and 3 show (generically) a payload P in the carriage phase C and the jettison phase J, respectively. Accordingly, the payload P is releaseably coupled to (meaning coupling in a manner that provides for selective release at a given time) a forward portion F of a platform L of an aircraft. The payload P is further releaseably coupled to an aft or rear portion R of the platform L about an aft pivot assembly A, such as an assembly described in the present disclosure. Generally, as the payload P is released by the aircraft (and/or by a pilot) about the forward portion F of the payload P, the payload P transitions from the carriage phase to the jettison phase, and will tend to be released in a downward direction (e.g., due to gravity) as illustrated in FIG. 3. This can facilitate a safe release of a payload. For a certain time period during jettison, an aft assembly will remain releaseably attached to the rear portion R of the platform L until final (and safe) deployment of the payload P (and the attached assembly A) from the aircraft.

The aft pivot assembly 100 can include a mount device 102 securable to an aft portion 104 of a payload 106. The mount device 102 can be a saddle-type mount having a lower plate 108 sized and configured to be positioned within and conform to the body of the payload 106 that can be fastened to an upper plate 112, sized and configured to be positioned without and conform to the body of the payload, by fasteners 110. In other words, the upper plate 112 can be positioned substantially external to the payload 106 about an external or outer surface (see FIGS. 1A and 1C), with the lower plate 108 being positioned internal to the payload about an internal or inner surface. The assembly 100 can include a limit device extending from or coupled to the mount device 102. A shaft 116 can be rotationally coupled to the mount device 102 by a spherical bearing 118 to facilitate rotation of the shaft about its y-axis and/or z-axis (and relative to the mount device 102), as represented by the respective arrows. A retaining collar 120 can attach the shaft 116 to the spherical bearing 118.

In this example, the limit device comprises a protrusion or collar 114 extending rearward from the mount device 102 and having an opening 122 through which the shaft 116 is loosely received (FIGS. 1A and 1C). The opening 122 can be any shape, such as conical shaped (or cylindrical), can include any cross-sectional shape, and can include a stop surface 123. The collar 114 can comprise a tapered bore, such that a diameter of the collar 114 can taper from a smaller diameter to a larger diameter in a direction going from a forward location to a rearward location of the collar 114. In other words, a forward diameter can be configured to be smaller than a rearward diameter of the collar 114, as shown in FIG. 1A. A volume of space V1 is defined between the shaft 116 and the stop surface 123 of the opening 122, thus allowing the shaft to "float" within the collar 114, and thus providing limited movement or rotation about its y-axis and z-axis (and relative to the mount device). In other words, the spherical bearing 118 facilitates limited movement of the shaft 116 about its y-axis and z-axis relative to the mount device 102 up to the stop surface 123 of the collar 114. With FIG. 1A showing the mount device 102 and the payload 106 in the carriage phase, the y and z rotational movement of the shaft 116 during the jettison phase is best illustrated by dashed lines H, showing the limits of the movement of the shaft 116 as it is rotated up to the stop surface 123 about the y and/or z-axes of the shaft 116.

The assembly 100 can include a release component 124 releasably coupled to an aircraft (not shown). The shaft 116 can be rotationally coupled to the release component 124 about an interface (e.g., an aperture or hole that the shaft 116 interfaces with) of the release component 124, as represented by rotational arrows x, and the shaft can be rotatable about the x-axis of the shaft 116. In one example, a shaft member 126 attached to one end of the shaft 116 can be rotationally coupled to the release component 124. Alternatively, the release component 124 can directly receive the shaft 116. In any event, the release component 124 and its interface with the shaft 116 (as well as the interface of the shaft 116 with the mount device 102) facilitates unconstrained rotation of the shaft 116 about its x-axis relative to the mount device 102 and the release component 124 (and consequently rotation of the shaft about the aircraft). The release component 124 can have a bore 128 configured to receive a pin (not shown) of a platform of an aircraft to allow release of the payload 106 during jettison (e.g., FIG. 3). A ball and pin type of joint can be used in the aircraft payload deployment. However, the release component 124 of the present disclosure is not limited to a pin joint. The release component 124 can be any suitable rotational or releasable system, such as a hook, slot, latch, or the like.

In some examples, the shaft 116 can include a rear stop portion 130 and the shaft member 126 can include a forward stop portion 132 to allow the shaft 116 to traverse or linearly travel a limited distance along its x-axis relative to the release component 124, as represented by arrows D1. Rearward stop portion 130 and forward stop portion 132 provide hard stops that can be engaged to react jettison loads during a jettison event, such as for providing increased weight efficiency and platform range. In specific examples, various pods supported about an aircraft using an aft pivot assembly similar to the one illustrated provided a 20-30 lb. reduction in weight, and enabled one platform to achieve a target weight that they would not have otherwise hit using a conventional aft pivot.

Concurrently or separately from the y and z axis rotation of the shaft 116 as described above, the shaft 116 can be configured to rotate unconstrained about its x-axis and traverse along its x-axis up to the stop portions 130, 132 of the shaft 116 during the jettison phase.

The mount device 102 design and configuration described herein can be advantageous in eliminating carriage loads exerted on the aft portion 104 of the payload, as well as in withstanding jettison loads during the jettison phase. For example, the mount device 102 can include the lower plate 108 and the upper plate 112 fastened together on opposing sides of a wall portion 133 of the payload 106 or payload body, the wall portion 133 defining a hole 136 in the body of the payload 106 (FIG. 1A). The upper plate 112 can have a relatively large surface area (as compared to the other components of the assembly) that mates to the external surface of the payload 106. This tends to displace loads across a large area of the payload during jettison. Furthermore, the upper plate 112 can comprise a recess or recess portion 134 that is at least partially disposed through the payload hole 136 (i.e., located or positioned below the upper or external surface of the payload as made possible by the payload hole 136). A pair of flange mounts 138 can be formed and supported about the upper plate 112, the flange mounts 138 extending from the recess 134. The spherical bearing 118 can be positioned between and supported about the flange mounts 138 and rotationally coupled thereto via a fastener 139. The flange mounts 138 can be positioned lower than the external surface of the upper plate 112 and positioned a particular distance forward of the opening 122 of the collar 114 to reduce or optimize loads on the payload during jettison.

The collar 114 can include a pair of collar flanges 140 formed along a length of the mount device 102 and on either side of the shaft 116. The collar 114 can extend and be positioned rearward of the pivot point of the shaft 116 (i.e., the spherical bearing 118). This adds stiffness to the mount device 102 and further distributes loads during jettison. The opening 122 of the collar 114 can be located a particular distance rearward of the spherical bearing 118 and rearward of the upper plate 112, such that loads are carried from the shaft 116 and the release component 124 to the mount device 102, and consequently to a region of the payload 106 during jettison. The particular shape of the collar 114, and the substantial lack of structure making up the mount device 102 below the collar 114 (i.e., a rear portion of the mount device 102 does not extend rearwardly beyond a length of the collar 114), further reduces or optimizes loads on the payload during carriage and jettison. This is because the collar 114 is disposed a predefined distance rearward of the mount device 102 and because the mount device 102 is attached to the payload over a relatively large area as compared to typical aft attachments on payloads.

Advantageously, the aft pivot assembly 100 (as well as those described below) is designed to provide additional degrees of freedom (i.e., rotation of the shaft in the y-axis and/or the z-axis) over prior assemblies, such that there is no requirement to react carriage loads (i.e., carriage loads are minimized or eliminated), while at the same time permitting the pivot assembly to engage to react jettison loads. Depending upon the payload and the pivot assembly 100, this can effectively reduce the amount of load the pivot assembly 100 will need to react by 30-50%. For purposes of clarity, the examples of FIGS. 1A-1C, 4, and 5 provide aft pivot assemblies that eliminate carriage loads on the payload about the aft area or portion of the payload. Of course, because the payload is attached to an aircraft at a forward portion, carriage loads would exist at that forward attachment portion. However, the assemblies of FIGS. 1A-1C, 4, and 5 can entirely eliminate carriage loads on the payload rearward of the forward attachment portion (i.e., at the aft portion of the payload) under normal operating conditions.

Figure 4:
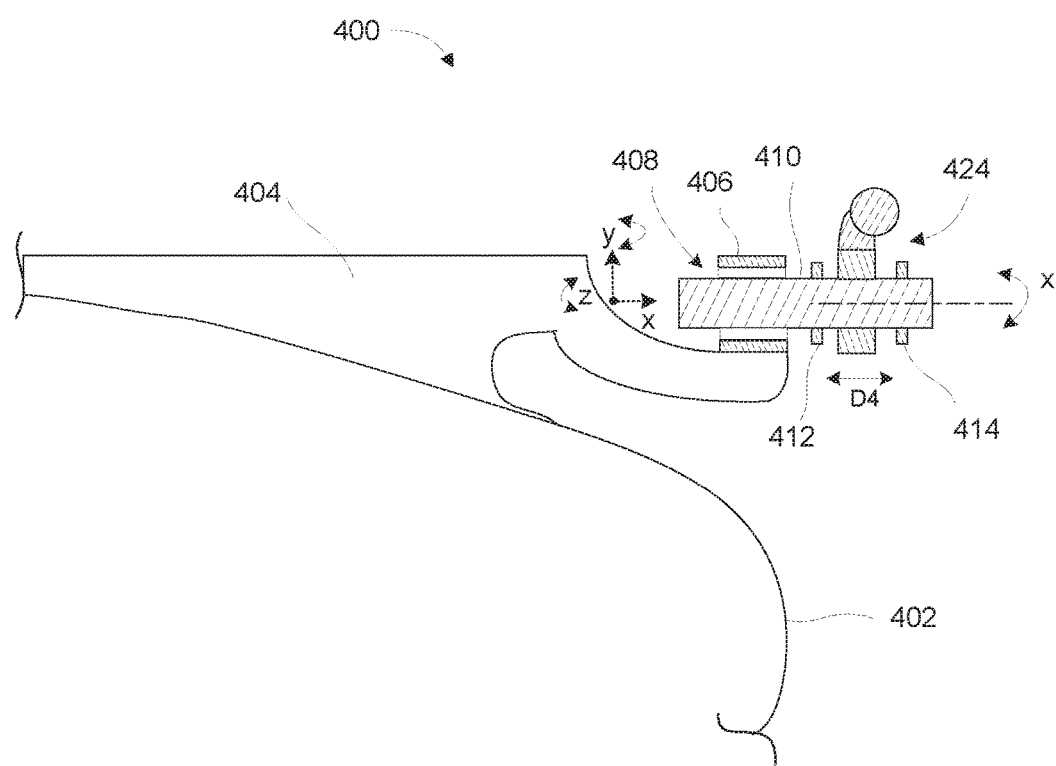
FIG. 4 shows a schematic and cross-sectional view of an aft pivot assembly attached to a payload, in accordance with an example of the present invention.

FIG. 4 shows a partial cross-sectional view of an aft pivot assembly 400 attached to a payload 402 in accordance with another example of the present disclosure. The aft pivot assembly 400 can comprise a mount device 404 coupled to or otherwise supported about the payload 402, the mount device 404 having a limit device 406 defining an opening 408. The limit device 406 can be supported via the mount device 404 so as to provide an interface for a shaft 410 operable with a release component 424. The shaft 410 can comprise a diameter smaller than the diameter of the opening 408, such that a volume of space is defined between the shaft 410 and the opening 408. Thus, the shaft 410 can be loosely received through the opening 408, such that the shaft 410 is rotatable about its y-axis and z-axis, and limited in such movement by the opening 408. It is noted that the position of the x,y,z graphics on the Figures are only for reference. It will be appreciated that the shafts described herein rotate about their respective couplings or devices in a similar manner as discussed above. The example of FIG. 4 is similar to the example of FIG. 1A, one difference being the absence of a spherical bearing in the example of FIG. 4. In this example, the shaft 410 can be supported such that it "floats" or tends to "float" about the opening 408 of the mount 404, the opening 408. This arrangement is made possible because, in use, the payload 402 is additionally removably secured to an aircraft at a forward portion of the payload during carriage. The opening 408 can be cylindrical, conical, or any other suitable shape, or any cross-sectional shape, such that a volume of space is defined between the shaft 410 and the opening 408. The shaft 410 can have a forward stop portion 412 and a rear stop portion 414 to limit movement of the shaft 410 along its x-axis, which direction is illustrated by arrows D4 (the stops being engageable to react jettison loads during a jettison event). As those skilled in the art will appreciate, the assembly 400 can further comprise a release component 424 and a mount device 404 having similar features and operations as disclosed above, with respect to FIGS. 1A-1C.

Figure 5:
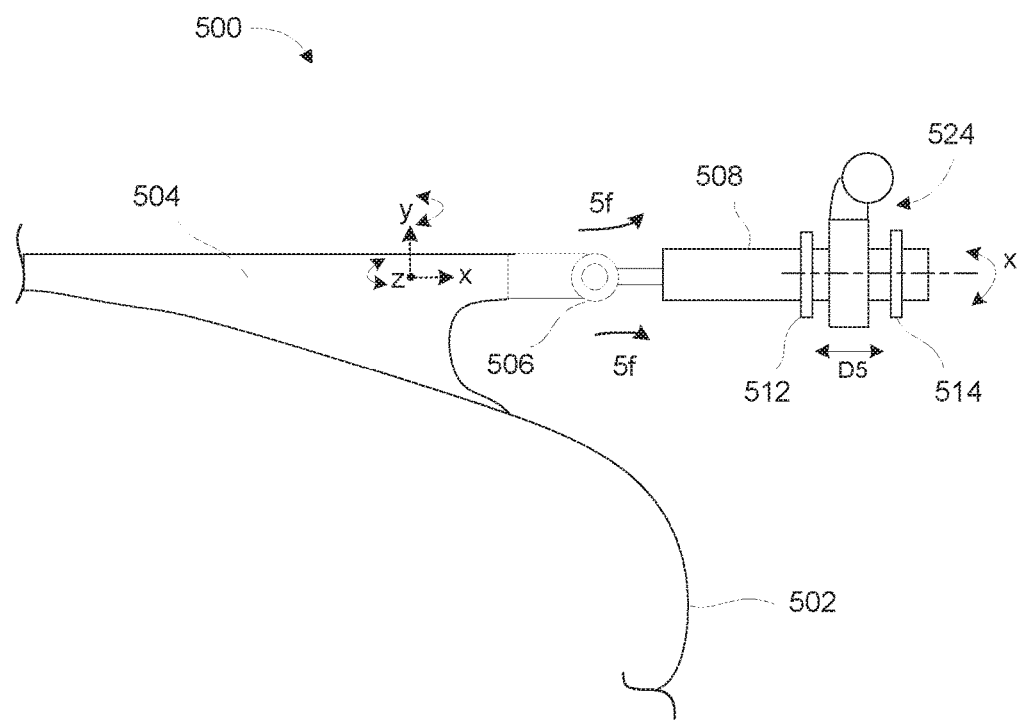
FIG. 5 shows a schematic side view of an aft pivot assembly attached to a payload, in accordance with an example of the present invention.

FIG. 5 shows a partial side view of an aft pivot assembly 500 attached to a payload 502 in accordance with another example of the present disclosure. The aft pivot assembly 500 can comprise a mount device 504 coupled to or otherwise supported about the payload 502, the mount device 504 having a limit device. In this example, the limit device can comprise a compliant bearing 506 supported via the mount device 504, and coupling a shaft 508 to the mount device 504, the shaft being operable and interfacing with a release component 524. The compliant bearing 506 can comprise a rubber or other type of compliant bearing or bearing material that facilitates y-axis and/or z-axis rotation of the shaft 508 relative to the mount 504, up to a rotational limit. In one aspect, the rotational limit about the y-axis and/or z-axis can be determined or provided by the type of compliant bearing selected. In another aspect, a structural limiting device like those described elsewhere herein can be used in connection with the shaft and the compliant bearing (e.g., a collar or other structure that physically limits rotation about the y and z axes). Thus, the shaft 508 can rotate about its y-axis and z-axis, and can also be limited in such movement by the compliant bearing 506, during jettison to eliminate carriage loads about the aft portion of the payload. In this example, the shaft 508 tends to rotate via the compliant bearing 506 relative to the mount 504 as the compliant bearing "bends" or "flexes", as represented by arrows 5f. The compliant bearing 506 can optimize loads transferable to the payload 502 during carriage, and can also be suitable to withstand loads during jettison, while at the same time eliminating carriage loads about the aft portion of the payload. The shaft 508 can further comprise a forward stop portion 512 and a rear stop portion 514 to limit movement of the shaft 508 along its x-axis, as represented by arrows D5, to enable the assembly to engage the stops to react jettison loads during a jettison event. As those skilled in the art will appreciate, the assembly 500 can have a release component 524 and a mount device 504 having similar features and operations as disclosed above with respect to the example assembly of FIGS. 1A-1C.

Figure 6:
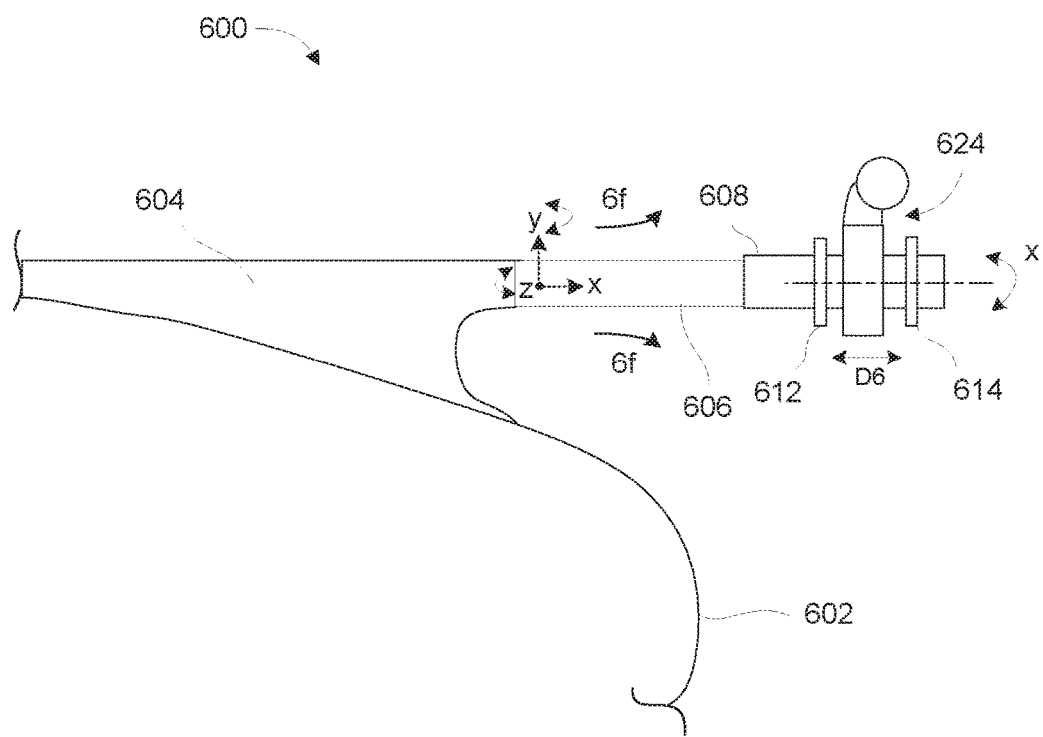
FIG. 6 shows a schematic side view of an aft pivot assembly attached to a payload, in accordance with an example of the present invention.

FIG. 6 shows a side view of an aft pivot assembly 600 attached to a payload 602 in accordance with another example of the present disclosure. The aft pivot assembly 600 can comprise a mount 604 coupled to or otherwise supported about the payload 602, the mount device 604 having a limit device. In this example, the limit device can comprise a leaf spring 606 supported via the mount device 504, and coupling a shaft 608 to the mount device 604, the shaft 608 being operable and interfacing with a release component 624. The shaft 608 and spring 606 can be flexible or moveable about the y axis and/or z axis, and limited in such movement by the leaf spring 606, during jettison and to avoid carriage loads. The spring 606 can function to optimize loads transferable to the payload 602 during carriage, as well as being suitable to withstand loads during jettison, while at the same time substantially minimizing or reducing carriage loads about the aft portion of the payload. Such minimization or reduction of carriage loads about the aft portion is likely a 30-50% delta between carriage and jettison loads as compared to conventional assemblies that do not have the same features of the assemblies of the example of FIG. 6. In this example, the shaft 608 and spring 606 tend to "bend" of "flex" about the y-axis and/or the z-axis about the mount device 604 and the payload 602, as represented by arrows 6f. The rotational limit within these axes can be defined by the degree of "bend" or "flex" within the spring 606, or this can be accomplished structurally with a limiting device as described elsewhere herein. The shaft 608 can further comprise a forward stop portion 612 and a rear stop portion 614 to limit movement of the shaft 608 along its x-axis, as represented by arrows D6, to enable the assembly to engage the stops to react jettison loads. As those skilled in the art will appreciate, the assembly 600 can have a release component 624 and a mount device 604 having similar features and operations as disclosed above with respect to the example assembly of FIGS. 1A-1C.

The assemblies of the present disclosure are advantageous in that they provide limited or virtually no resistance to motion of the payload during carriage and jettison. Moreover, the assemblies minimize or eliminate carriage loads exerted on the payload about the aft portion (because of the added degrees of rotation of the axes of the shaft) while having adequate strength to resist or react to loads and moments during the jettison phase (because of the same degrees of rotation of the axes of the shaft), thus reducing the amount of load the pivot will need to react by. In some cases, this load reduction can be as much as ⅓ to ½ over prior conventional assemblies. In addition, because carriage loads are avoided at the aft portion, material fatigue at the interface is eliminated as the joint accommodates or bears loads during a jettison event. With the removal of fatigue issues, the aft pivot assembly with its corresponding joint interface can be designed to the optimal material strength rather than a reduced fatigue allowable. These advantages can be particularly beneficial when the payload is comprised of composite material, where carriage loads at the aft portion that could cause undue fatigue of the composite material are avoided or minimized, but optimal resistance to jettison loads are preserved for safe deployment of a payload.

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

As used herein, various examples of the present invention can be referred to herein along with alternatives for the various components thereof. It is understood that such examples and alternatives are not to be construed as de facto equivalents of one another, but are to be considered as separate and autonomous representations of the present invention.

Furthermore, the described features, structures, or characteristics can be combined in any suitable manner in one or more examples. In the description, numerous specific details are provided, such as examples of lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the inventive concepts in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An aft pivot assembly facilitating release of a payload from a vehicle, the assembly comprising:
    a mount device securable to an aft portion of a payload of a vehicle;
    a shaft operable with the mount device, and rotatable about multiple shaft axes relative to the mount device; and
    a release component interfaced with the shaft and removably coupleable to the vehicle,
    wherein, in response to release of a forward attachment portion coupling the payload to the vehicle, the shaft is operable to move in multiple degrees of freedom in and about multiple axes as the payload transitions from a carriage phase to a jettison phase, whereby the assembly is configured to either minimize or eliminate carriage loads about the aft portion of the payload.

2. The assembly of claim 1, further comprising a limit device operable with the mount device to limit rotation of the shaft about the multiple shaft axes during the jettison phase.

3. The assembly of claim 2, wherein the limit device comprises a collar extending from the mount device, the shaft extending through the collar, and wherein a volume of space is defined between the collar and the shaft to facilitate movement of the shaft about at least two shaft axes relative to the mount device during the jettison phase.

4. The assembly of claim 3, wherein the collar includes a conical opening having an inner stop surface configured to limit movement of the shaft about its y-axis and z-axis relative to the mount device.

5. The assembly of claim 2, wherein the limit device comprises a compliant bearing situated between the shaft and the mount device, the compliant bearing facilitating movement of the shaft about its y-axis and/or its z-axis relative to the mount device during the jettison phase.

6. The assembly of claim 2, wherein the limit device comprises a leaf spring situated between the shaft and the mount device, the leaf spring facilitating movement of the shaft about its y-axis and/or its z-axis relative to the mount device during the jettison phase.

7. The assembly of claim 1, further comprising a spherical bearing rotatably coupling the shaft to the mount device, wherein the spherical bearing facilitates movement of the shaft about its y-axis and z-axis relative to the mount device during the jettison phase.

8. The assembly of claim 7, further comprising a retainer rotationally attaching the spherical bearing to the shaft to facilitate rotation of the shaft about its x-axis relative to the mount device during the jettison phase.

9. The assembly of claim 1, wherein the release component is rotatably coupled to the shaft to facilitate rotation of the shaft about its x-axis and to facilitate translation of the shaft along its x-axis relative to the release component during the jettison phase.

10. The assembly of claim 1, wherein the shaft includes at least one stop portion to limit movement of the shaft along its x-axis relative to the release component during the jettison phase, the at least one stop being engageable to react to jettison loads during the jettison phase.

11. The assembly of claim 1, wherein the mount device comprises a saddle mount having an upper plate and a lower plate fastened together about a wall of the payload, the lower plate being positioned opposite the upper plate.

12. A payload system releasable from an aircraft, the payload system comprising:
a payload having a forward attachment portion releasably coupled to an aircraft, and an aft portion releasably coupled to the aircraft;
an aft pivot assembly secured to the aft portion of the payload, the aft pivot assembly comprising:
a mount device supported about the payload;
a shaft operable with the mount device, and rotatable about multiple shaft axes relative to the mount device; and
a release component interfaced with the shaft and removably coupled to the aft portion of the aircraft,
wherein, in response to release of the forward attachment portion of the payload from the aircraft, the shaft is operable to move in multiple degrees of freedom in and about multiple axes relative to the mount device as the payload transitions from a carriage phase to a jettison phase, whereby the assembly is configured to either minimize or eliminate carriage loads about the aft portion of the payload.

13. The system of claim 12, further comprising a limit device operable with the mount device to limit rotation of the shaft about the multiple shaft axes during the jettison phase.

14. The system of claim 13, wherein the limit device comprises a collar extending from the mount device, the shaft extending through the collar, and wherein a volume of space is defined between the collar and the shaft to facilitate movement of the shaft about at least two shaft axes relative to the mount device during the jettison phase, and wherein the collar comprises an inner stop surface limiting movement of the shaft about its y-axis and z-axis relative to the mount device during the jettison phase.

15. The system of claim 13, wherein the limit device comprises a compliant bearing situated between the shaft and the mount device, the compliant bearing facilitating movement of the shaft about its y-axis and/or its z-axis relative to the mount device during the jettison phase.

16. The system of claim 13, wherein the limit device comprises a leaf spring situated between the shaft and the mount device, the leaf spring facilitating movement of the shaft about its y-axis and/or its z-axis relative to the mount device during the jettison phase.

17. The system of claim 12, further comprising a spherical bearing rotatably coupling the shaft to the mount device, wherein the spherical bearing facilitates movement of the shaft about its y-axis and z-axis relative to the mount device during the jettison phase.

18. The system of claim 12, wherein the release component is rotatably coupled to the shaft to facilitate rotation of the shaft about its x-axis and to facilitate translation of the shaft along its x-axis during the jettison phase.

19. A method for facilitating release of a payload from a vehicle, the method comprising:
providing an aft pivot assembly operable to secure a payload to a vehicle about an aft portion of the payload, the aft pivot assembly comprising:
a mount device securable to an aft portion of a payload of a vehicle;
a shaft operable with the mount device; and
a release component interfaced with the shaft and removably coupled to the vehicle;
facilitating release of a forward attachment portion coupling the payload to the vehicle to initiate transition of the payload from a carriage phase to a jettison phase;
facilitating rotation of the shaft about multiple shaft axes relative to the mount device; and
facilitating movement of the shaft in multiple degrees of freedom in and about multiple axes relative to the mount device as the payload transitions from the carriage phase to the jettison phase, whereby the assembly is configured to either minimize or eliminate carriage loads about the aft portion of the payload.

20. The method of claim 19, further comprising facilitating limitation of the rotation of the shaft about the shaft axes.

* * * * *